Oct. 31, 1933.                F. A. HELLMANN                 1,932,586
                     COMBINED HEATING AND COOLING SYSTEM
                        Filed Aug. 13, 1931        2 Sheets-Sheet 1
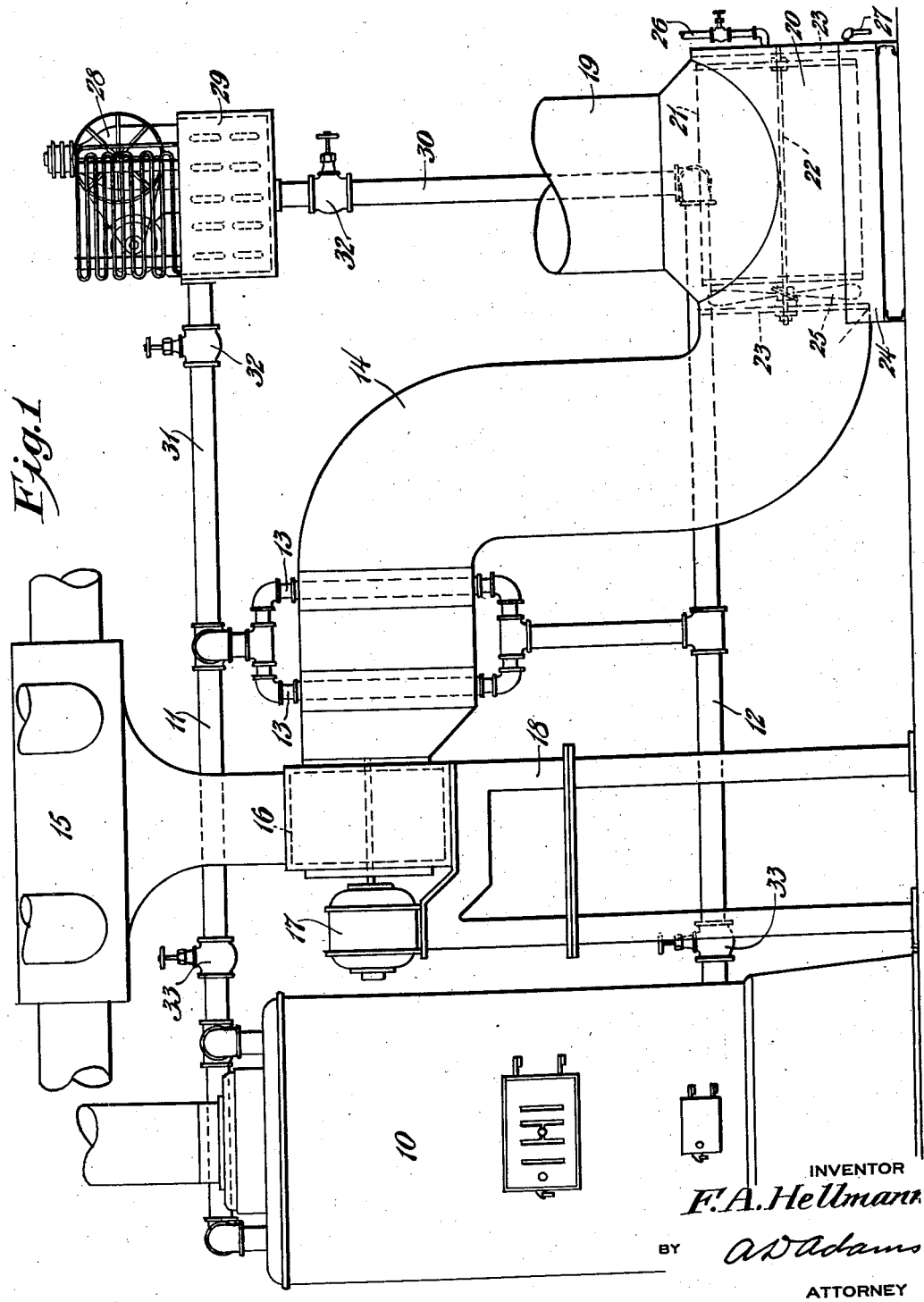
INVENTOR
F. A. Hellmann
BY  A. D. Adams
ATTORNEY Oct. 31, 1933.  F. A. HELLMANN  1,932,586
COMBINED HEATING AND COOLING SYSTEM
Filed Aug. 13, 1931   2 Sheets-Sheet 2
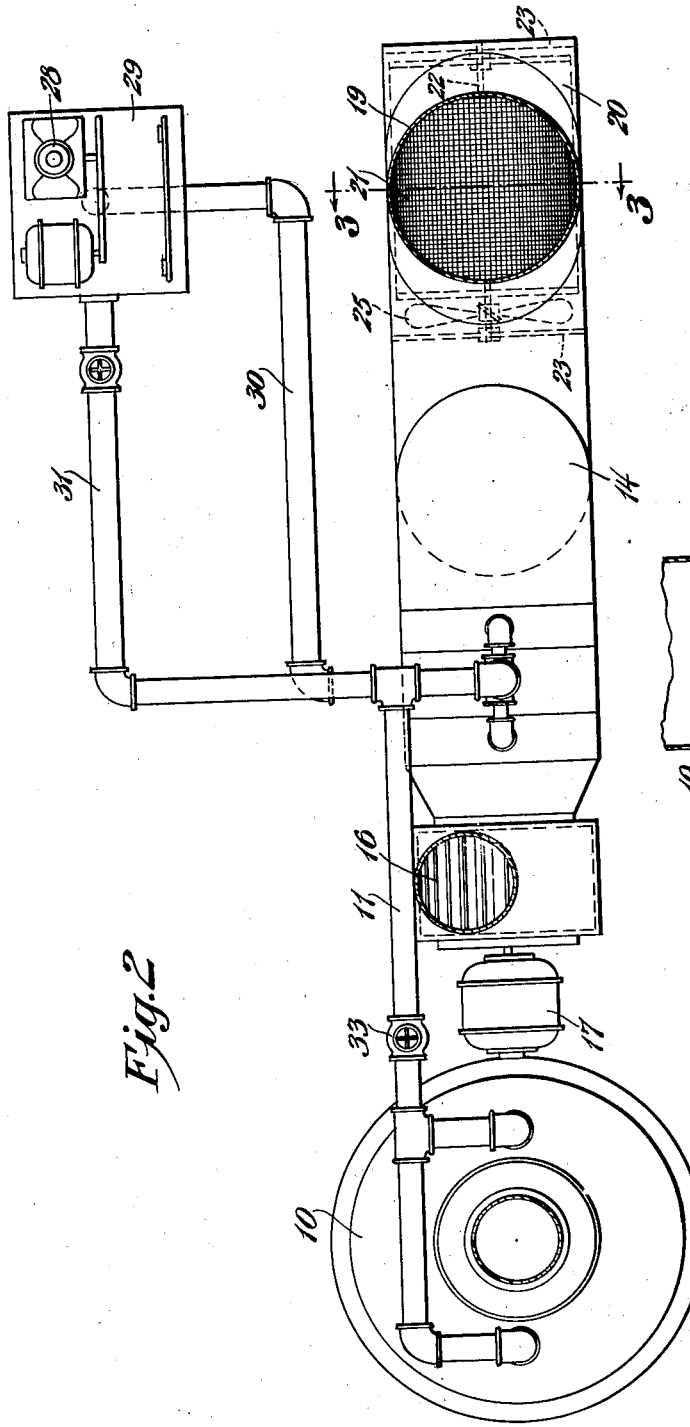
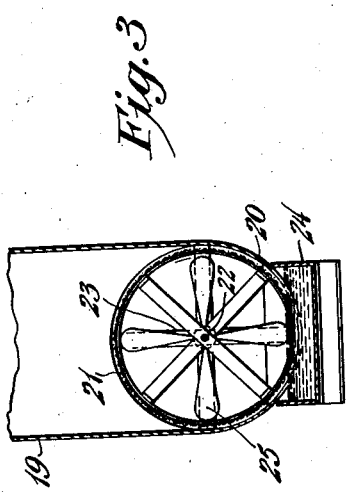
INVENTOR
F. A. Hellmann
BY A. D. Adams
ATTORNEY Patented Oct. 31, 1933

1,932,586

UNITED STATES PATENT OFFICE 1,932,586

COMBINED HEATING AND COOLING SYSTEM

Frederick A. Hellmann, Chattanooga, Tenn., assignor of one-third to Walter S. Adams, Jr., Chattanooga, Tenn.

Application August 13, 1931. Serial No. 556,747

2 Claims. (Cl. 257—8)

This invention relates to heating and cooling systems and, among other objects, aims to provide a novel combination of a cooling unit with a heating system to enable a single installation to heat and cool residences and other buildings with washed, humidified air. The main idea is to produce a simple, economical and reliable installation capable of automatic control to maintain any desired room temperatures throughout the year.

Other aims and advantages of the invention will appear in the specification, when considered in connection with the accompanying drawings, wherein:—

Fig. 1 is a side elevation of one form of apparatus embodying the invention;

Fig. 2 is a top plan view of the apparatus shown in Fig. 1; and

Fig. 3 is a sectional view taken on the line 3—3 of Fig. 2.

The illustrated embodiment of the invention is applied to a hot air system, although it will be understood that the invention contemplates the application of a cooling system to hot water and steam plants. In this instance, the source of heat is an ordinary hot water boiler or furnace 10 diagrammaticaly illustrated in Figs. 1 and 2. The furnace may be heated by solid, liquid or gaseous fuel and its operation may be automatically controlled in response to room temperatures.

The boiler is shown as having delivery and return pipes 11 and 12 connected to a heat exchanger or radiator elements 13 extending through an air duct 14. It will be understood that the heat exchanging elements or radiator may be of any conventional design and the tubular elements may have ordinary radiating fins to increase their heat exchanging capacity.

The air duct 14 is connected to deliver heated air through a manifold 15 and the usual branch ducts to the registers or grilles (not shown) in the various rooms. The air is circulated through the conduit by means of a fan 16 in the conduit driven by a motor 17 supported on a stand 18 (Fig. 1). The motor lends itself readily to automatic control in response to room temperatures. The circulating air is returned to be re-circulated through a return conduit 19, into which some outside air may be admitted, if desired.

The re-circulating air is washed and humidified before it comes in contact with the heat exchanger. In this example, a combined washer and humidifier is arranged in a horizontal section 20 of the conduit 14 to which the return conduit is connected. The horizontal section constitutes a casing for a rotatable cylindrical screen or reticulated member 21 mounted on a shaft 22. The shaft is supported within the casing by cross members or spiders 23. The cylindrical screen element is of slightly smaller diameter than the conduit and its lower portion is submerged in a pan 24 filed with water, the arrangement being such that as the screen rotates, it carries a film of water, through which the air must pass to be cleansed or washed and also humidified, before it goes through the open end of the screen into the conduit 14. The screen is preferably rotated by an impeller fan 25 secured to the shaft 22, the velocity of the air being sufficient to cause slow rotation. Obviously, the screen may be positively driven. Water is maintained at a fixed or constant level in the pan 24 by means of a valved supply pipe 26 and an overflow or drain pipe 27. If desired, the valve may be automatically controlled by an ordinary float (not shown).

That portion of the system just described is adapted to heat a building with washed and humidified air. To convert it into a cooling system for summer use, there is shown a mechanical refrigerating unit 28 having a cold water storage tank 29 which is connected by pipes 30 and 31 to the heat exchanger or radiator elements 13. The unit is also adapted to be controlled automatically in response to room temperatures and the same thermostatic element (not shown) may be employed for both the heating and cooling units.

The forced draft circulation of the air lends itself very readily to the operation of the cooling unit because the cooled air which passes the heat exchanger or radiator elements 13 would otherwise seek the lowest level in the system or in the conduit 14 and would not circulate at all. Moreover, the combined air washer and himidifier serves to cool the air somewhat before it comes in contact with the heat exchanger elements 13. When a constant supply of fresh water is supplied to the water pan 24 during the summer, the cooling effect of the water is quite noticeable. Thus, the washer and humidifier serves a dougle purpose and greatly increases the efficiency of the cooling system.

When the heater is employed, the cooling unit may be disconnected by closing valves 32 arranged in the pipes 30 and 31 and, when the cooling unit is employed, valves 33 in the hot water pipes 11 and 12 are closed. Thus, the system may be converted for summer or winter use by the simple expedient of operating the valves and setting the ordinary thermostatic control mechanism (not shown).

From the foregoing description, it will be seen that the improved installation is relatively simple. Furthermore, the cooling unit can be installed in conjunction with an ordinary hot air heating system without requiring many expensive changes. The combined system insures comfortable conditions throughout the year at very little added cost.

Obviously, the present invention is not restricted to the particular embodiment thereof herein shown and described. Moreover, it is not indispensable that all the features of the invention be used conjointly, since they may be employed advantageously in various combinations and subcombinations.

What I claim is:—

1. In a combined heating and cooling system having a common air circulating conduit, a circulating fan in the conduit; a single heat exchanger in the conduit; independent heating and cooling means connected to the exchanger; an air washer and humidifier comprising a cylindrical screen mounted to rotate on a horizontal axis in the conduit; a pan of water within which the lower portion of the screen is submerged; and air propelled blades connected to rotate the screen.

2. In a combined heating and cooling system having a common air circulating conduit, a circulating fan in the conduit; a single heat exchanger in the conduit; independent heating and cooling means connected to the exchanger; an air washer and humidifier comprising a cylindrical screen mounted to rotate on a horizontal axis in the conduit; a pan of water within which the lower portion of the screen is submerged; an air return conduit connected to deliver air through the screen into the circulating conduit; air propelled means for rotating the screen; and means to maintain a constant water level in said pan.

FREDERICK A. HELLMANN.